US00RE34079E

United States Patent [19]

Gatza et al.

[11] E Patent Number: Re. 34,079

[45] Reissued Date of Patent: Sep. 29, 1992

[54] METHOD AND APPARATUS FOR CONSERVING BATTERY POWER IN A SNOWMOBILE ELECTRICAL SYSTEM

[75] Inventors: Ward K. Gatza; Ronald E. Chasteen, both of Colorado Springs, Colo.

[73] Assignee: Pacer Industries Inc., Branford, Conn.

[21] Appl. No.: 735,396

[22] Filed: Jul. 24, 1991

Related U.S. Patent Documents

Reissue of:

[64] Patent No.: 5,024,205
Issued: Jun. 18, 1991
Appl. No.: 502,410
Filed: Mar. 30, 1990

[51] Int. Cl.[5] ..... F02P 11/00

[52] U.S. Cl. ..... 123/632; 123/198 DC; 123/644; 307/10.7

[58] Field of Search .... 123/198 DC, 198 D, 198 DB, 123/478, 598, 630, 632, 644; 307/10.7; 320/13

[56] References Cited

U.S. PATENT DOCUMENTS

| | | | |
|---|---|---|---|
| 3,395,288 | 7/1968 | Brimer | 307/10.7 |
| 3,924,595 | 12/1975 | Brungsberg | 123/632 |
| 4,213,513 | 7/1980 | Beck | 123/198 DC |
| 4,218,717 | 8/1980 | Shuster | 307/10.7 |
| 4,438,752 | 3/1984 | Cheung | 123/198 D |
| 4,581,571 | 4/1986 | Hansen | 307/10.7 |
| 4,699,109 | 10/1987 | Hensel | 123/478 |
| 4,812,677 | 3/1989 | Perry | 307/10.7 |
| 4,893,605 | 1/1990 | Ozawa | 123/632 |
| 4,917,061 | 4/1990 | Nagakura | 123/198 DC |

FOREIGN PATENT DOCUMENTS

| | | | |
|---|---|---|---|
| 2911043 | 8/1980 | Fed. Rep. of Germany | 123/632 |

*Primary Examiner*—Willis R. Wolfe
*Attorney, Agent, or Firm*—Richard W. Hanes

[57] ABSTRACT

A snowmobile electrical system having a battery conservation circuit. The system is designed to conserve battery power after deactivation of the engine using the kill switch, even if the key switch is left on. Battery power is normally consumed by continued connection of the microprocessor-based electronic engine control unit (ECU) to the battery after kill switch activation. To prevent battery consumption, the ECU monitors the electrical output of the ignition system at a position within the system wherein the output is dependent on engine speed. If the output drops to a specified level, a signal generator in the ECU is activated. Signals from the signal generator are directed to a solid state switching system which disconnects the battery from the ECU. As a result, battery consumption is controlled.

23 Claims, 3 Drawing Sheets

METHOD AND APPARATUS FOR CONSERVING BATTERY POWER IN A SNOWMOBILE ELECTRICAL SYSTEM

Matter enclosed in heavy brackets [ ] appears in the original patent but forms no part of this reissue specification; matter printed in italics indicates the additions made by reissue.

BACKGROUND OF THE INVENTION

The present invention generally relates to snowmobile electrical systems, and more particularly to a snowmobile electrical system designed to prevent excess battery discharge.

Snowmobile engines have become increasingly sophisticated in recent years. Modern snowmobile engines include a wide variety of complex mechanical and electronic components. For example, some snowmobile engines are now equipped with electronic fuel injection systems. The fuel injectors of these systems are operated by complex digital electronic circuitry in the form of an electronic control unit (ECU) capable of monitoring various operating characteristics of the engine, including engine/air temperature levels, barometric pressure, RPM, and throttle position. The ECU enables the fuel injection system to properly deliver the correct amount of fuel to the engine. This type of system is superior to conventional mechanical carburetor systems which require frequent adjustment and are susceptible to malfunction during adverse environmental conditions.

In addition, all snowmobiles also include a device known as a "kill switch", as well as a conventional key switch. The kill switch consists of a mechanical switch positioned directly adjacent a user's hand during operation of the snowmobile. Activation of the switch causes a disruption in the flow of current in the snowmobile ignition system, thereby preventing proper engine ignition. As a result, activation of the kill switch causes the engine to stop. The key switch also enables and disables the ignition system, and further provides power to the electrical system.

However, conventional kill switch systems do not cause disconnection of the snowmobile battery from the ECU, even if the engine has stopped running. If the key switch remains in the "on" or "run" position, the ECU will remain connected to the snowmobile battery, causing a power drain.

Many snowmobile operators use the kill switch to turn off the engine during normal use instead of using the key switch. Thereafter, they leave the snowmobile for extended periods of time with the key switch remaining in the "on" position. This often occurs when a snowmobile operator is hunting, ice fishing, etc. As a result, battery drainage will occur due to continued connection of the battery to the ECU. When the snowmobile operator returns, the snowmobile will not start if the battery is sufficiently drained to prevent activation of the fuel injection system and its electrical components. Accordingly, the snowmobile operator is left stranded, often in isolated wilderness areas.

A need therefore exists for an improved snowmobile electrical system having a sub-system for preventing battery discharge after activation of the kill switch under the circumstances described above (e.g. when the key switch is left on.) The present invention satisfies this need in a unique and effective manner, as indicated below.

SUMMARY OF THE INVENTION

It is an object of the present invention to provide a battery conservation system in a snowmobile designed to prevent battery discharge when the key switch is left on after activation of the kill switch.

It is another object of the invention to provide a battery conservation system in a snowmobile which is entirely automatic in operation.

It is a further object of the invention to provide a battery conservation system in a snowmobile which uses a minimal number of operating components.

It is a still further object of the invention to provide a battery conservation system in a snowmobile which uses inexpensive, readily available components.

It is an even further object of the invention to provide a battery conservation system in a snowmobile which is usable in a wide variety of different engines.

In accordance with the foregoing objects, a snowmobile electrical system of improved design is disclosed. Specifically, the system conserves battery power after deactivation of the engine using the kill switch even if the key switch is left on. Normally, activation of the kill switch in snowmobiles having an ECU-controlled fuel injection system does not disconnect the ECU from the battery. This results in excessive battery discharge if the key switch is left in the "on" position. The present invention uses an arrangement of electrical components which eliminates this problem.

In addition to an ECU having a microprocessor for controlling fuel delivery, modern snowmobile engines also include a capacitive discharge unit electrically connected to the charging coil of the engine alternator. In operation, the capacitive discharge unit receives an electrical current from the alternator, and subsequently delivers this current to an ignition coil which is connected to one or more spark plugs. Activation of the kill switch (which is connected to the capacitive discharge unit) prevents proper current delivery from the alternator to the capacitive discharge unit. This prevents the capacitive discharge unit from delivering electrical impulses of proper voltage to the ignition coil. As a result, the engine stops running. However, the ECU remains connected to the battery.

In accordance with the present invention, a detection system within the ECU is provided in which the electrical output of the ignition system is monitored. If the output drops below a specified threshold value, a clock within the microprocessor of the ECU is activated. After the expiration of a selected time period, the microprocessor generates a battery disconnection signal from an internal signal generator. The signal is directed to a solid state switching system electrically positioned between the battery and the microprocessor. Upon receipt of the battery disconnection signal, the switching system disconnects the battery from the ECU. As a result, battery drainage is prevented. This allows the snowmobile engine to be restarted, even after a long time period.

These and other objects, features, and advantages of the invention shall be described below in the following Brief Description of the Drawings and Detailed Description of a Preferred Embodiment.

DETAILED DESCRIPTION OF A PREFERRED EMBODIMENT

As described herein, a snowmobile electrical system is provided which conserves battery power after activation of the emergency kill switch, even if the key switch is left on. The system is highly efficient and entirely automatic in operation.

A. Components

Figure 1:
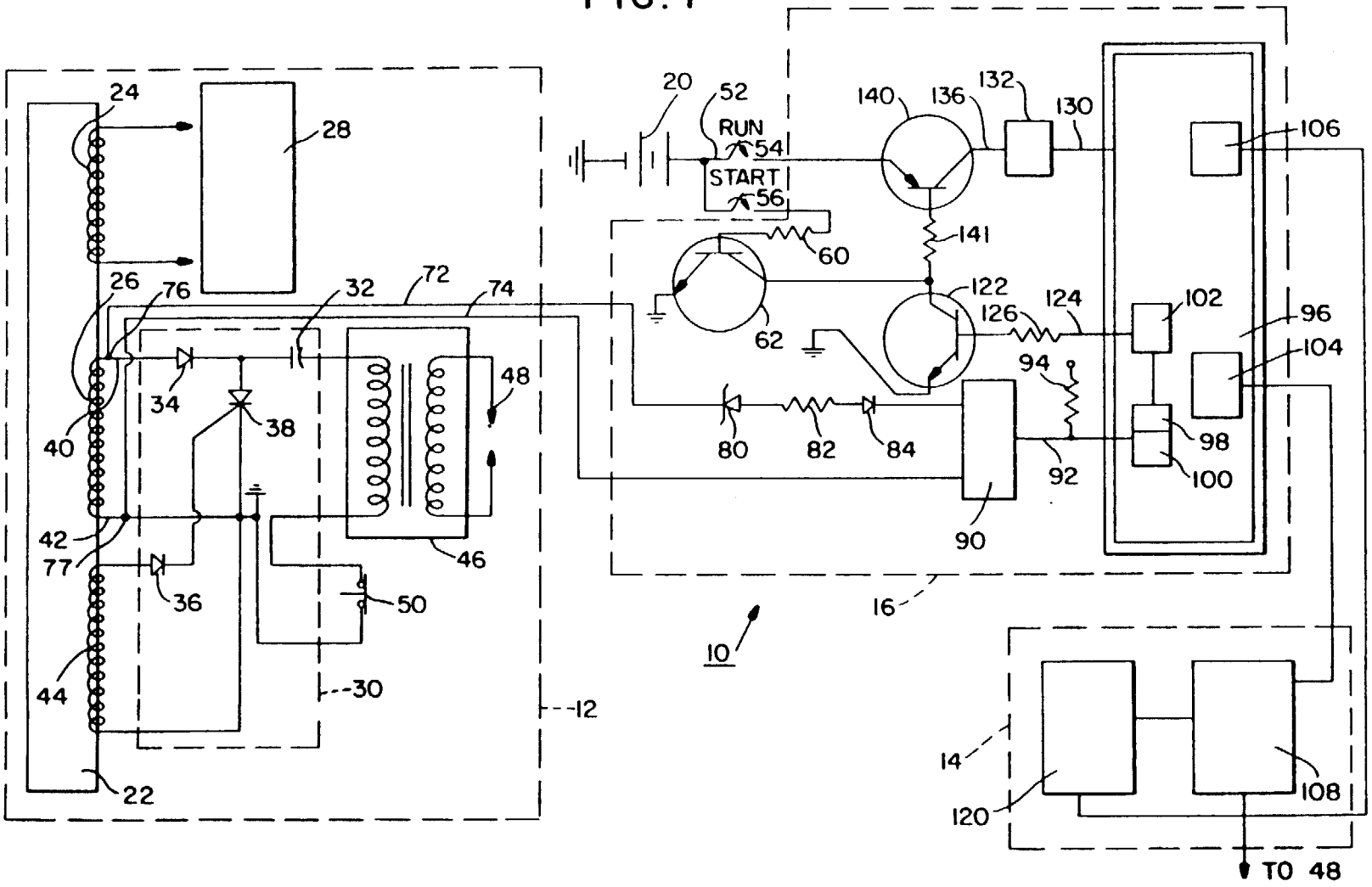
FIG. 1 is a schematic illustration of a snowmobile electrical and ignition system manufactured in accordance with the present invention.

A snowmobile electrical system 10 produced in accordance with the invention is schematically illustrated in FIG. 1. While the following description shall identify certain components by part number and manufacturer, a wide variety of different components by other manufacturers may be used. The present invention shall not be limited to the specific components presented herein which are identified for example purposes only.

With reference to FIG. 1, the electrical system 10 basically includes an ignition system 12, fuel injection system 14, engine control unit (ECU) 16, and a battery 20, all of which electrically communicate with each other as shown in FIG. 1.

The ignition system 12 includes a conventional alternator 22 provided as original equipment by the snowmobile manufacturer having a stator divided primarily into a lighting coil 24 and a charge coil 26. The lighting coil 24 is used to power various electrical components 28 of the snowmobile, including but not limited to the headlights, taillights, speedometer, tachometer, and the like (not shown.) The charge coil 26 provides the electrical current necessary to enable the spark plugs 48 in the ignition system 12 to operate, as described in greater detail below.

The charge coil 26 is connected to a capacitive discharge unit 30 of a type known in the art (Injection Research Specialists, Inc., part no. 780-1000). The capacitive discharge unit 30 includes at least one high voltage capacitor 32 therein (rated at about 1.0 microfarads) designed to retain an electrical charge. In the embodiment of FIG. 1, the capacitive discharge unit 30 further includes rectifier diodes 34, 36 (RCA Co., part no. SK 3043) and an SCR 38 (silicon controlled rectifier; RCA Co. part no. SK 3635). The capacitive discharge unit 30 is connected to the charge coil 26 through leads 40, 42 as shown. The capacitive discharge unit 30 is triggered by the ECU 16 or by an additional coil in the alternator 22 called a pulser coil 44. In the embodiment of FIG. 1, the pulser coil 44 is energized by moving magnets (not shown) in the alternator 22 after the capacitor 32 is charged by the charge coil 26. When energized, current flows from the pulser coil 44 through the rectified diode 36 into the gate terminal of the SCR 38. This causes the SCR to switch on and deliver a current pulse from the capacitor 32 to the primary winding of a double ended ignition coil 46.

As illustrated, the capacitive discharge unit 30 is electrically connected to the ignition coil 46 which is of a type known in the art (Automotive Controls Corporation, part no. AR-210.) The ignition coil 46 receives electrical current from the capacitive discharge unit 30 and steps the voltage up to a level sufficient to enable the spark plugs 48 to properly fire. For example, the electrical current delivered from the capacitive discharge unit 30 normally has a voltage of about 300 V upon delivery to the ignition coil 46. However, the electrical impulses delivered from the ignition coil 46 have an average voltage of about 20,000 V.

Also included within the electrical system 10 is a emergency engine kill switch 50 and a multi-position key switch 52 of conventional design normally provided as original equipment by the snowmobile manufacturer. The key switch 52 enables and disables the ignition system 12 and provides power to the electrical system 10, as indicated above. Specifically, the key switch 52 shown in FIG. 1 includes two positions labelled "run" (ref. no. 54) and "start" (ref. no. 56) as illustrated. The start position 56 is electrically connected to a resistor 60 (10K ohm, 0.5 watt) and a transistor 62 (Motorola Co., part no.2N3904), the function of which will be described hereinafter.

Activation of the kill switch 50 disrupts the electrical circuit between the capacitive discharge unit 30 and the charge coil 26 of the alternator 22. As a result, the capacitive discharge unit 30 is unable to deliver electrical power of sufficient voltage to maintain engine operation. The kill switch 50 is primarily designed to deactivate the engine during emergency situations. However, many snowmobile operators use the kill switch 50 to stop the engine under normal circumstances instead of using the key switch 52, causing the battery discharge problems described above.

The kill switch 50 consists of a conventional two-position electrical switch provided as original equipment by the snowmobile manufacturer. The kill switch 50 may be configured in a normally open or closed position. The circuit of FIG. 1 is designed so that the kill switch 50 remains in a normally closed position. Opening of the kill switch 50 in this circuit causes the engine to stop by preventing the passage of return current into the capacitive discharge unit 30 from the alternator 22.

Figure 2:
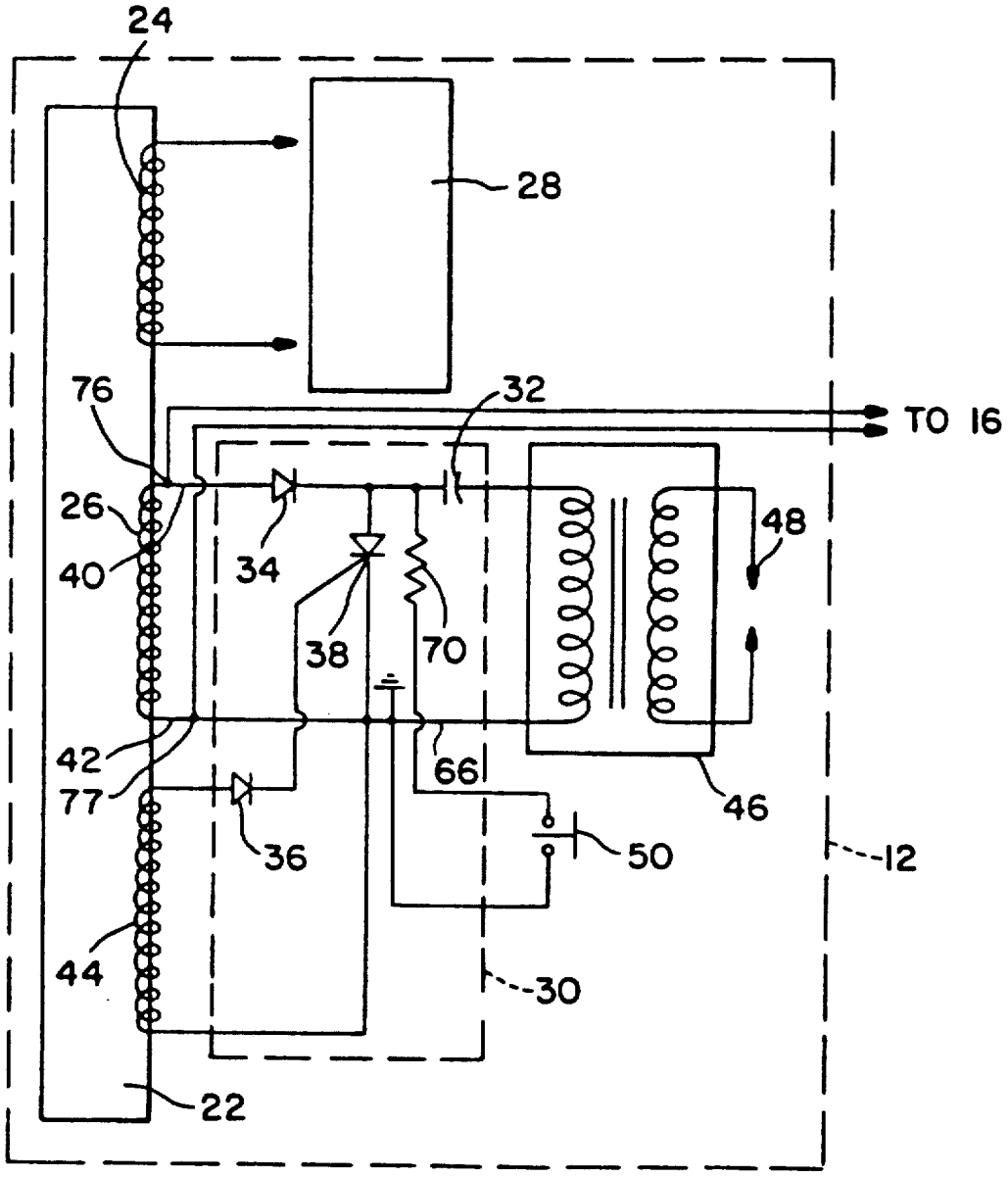
FIG. 2 is a partial schematic illustration of an alternative embodiment of the system of FIG. 1.

In the alternative embodiment of FIG. 2, the circuit is modified so that the kill switch 50 is normally in an open position. The remaining portions of the circuit not shown in FIG. 2 are the same as those illustrated in FIG. 1. With continued reference to FIG. 2, an additional ground connection line 66 associated with the capacitive discharge unit 30 is provided as illustrated. Also, an additional source of resistance 70 is provided (e.g. a resistor of selectively variable value) which is used to discharge the charge coil 26. As a result, electrical current from the charge coil 26 is shunted to ground. This prevents the capacitor 32 in the capacitive discharge unit 30 from being charged to a high voltage when the kill switch 50 is closed.

The ignition system 12 electrically communicates with the ECU 16 as illustrated in FIG. 1. Specifically, in the embodiment of FIG. 1, leads 72, 74 are provided at positions 76, 77 so that the output of the charge coil 26 may be directed into the ECU 16. The leads 72, 74 are designed to provide the ECU 16 with an indication of the electrical output of the ignition system 12. However, the present invention shall not be limited to the connection of the leads 72, 74 at any specific position in the ignition system 12. The leads 72, 74 may be connected at any point within the ignition system 12 where electrical output will vary with engine operating speed.

Figure 3:
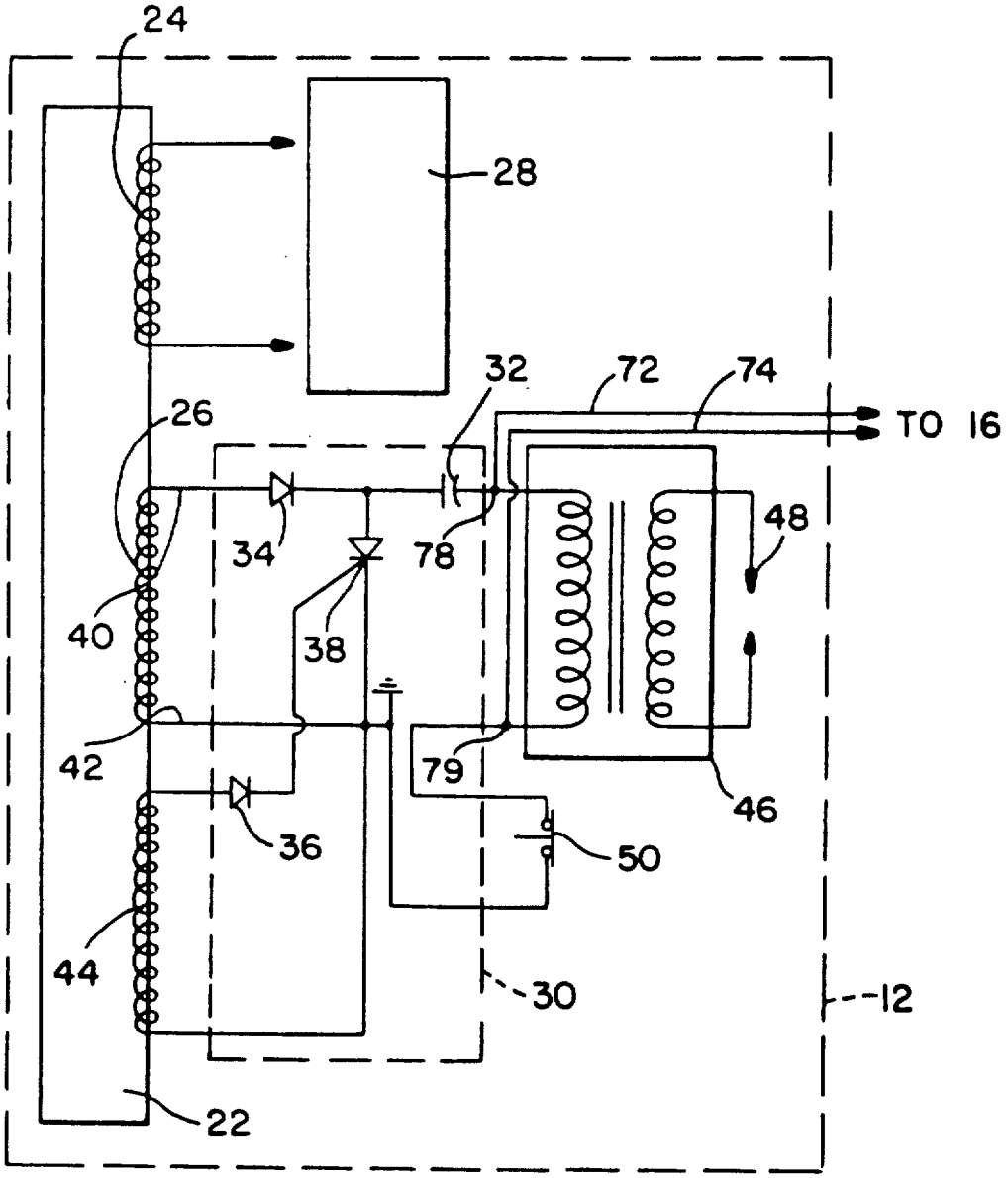
FIG. 3 is a partial schematic illustration of a further embodiment of the system of FIG. 1.

For example, in the alternative embodiment of FIG. 3, the leads 72, 74 may be connected at positions 78, 79 so that the output of the capacitive discharge unit 30 may be directed into the ECU 16.

In the embodiments of the invention described herein, lead 72 is connected to a zener diode 80 (Motorola Co., part no. 1N979A) within the ECU 16. The zener diode 80 functions as a threshold detector. It will not allow the passage of an electrical current having a voltage below a specified level. In the present embodiment, this level is about 56 V (within a variation of about 10%). Accordingly, when the output of the capacitive discharge unit 30 is below this voltage level, current will not flow past the diode 80. In a zener diode, the applied voltage is opposite in polarity from the voltage which causes forward current flow in a rectifier diode. The zener diode conducts forward current when the voltage causes what is commonly known as "avalanche breakdown" to occur in the system.

Assuming that current is able to pass through the zener diode 80, the current then passes through a resistor 82 (30K ohm, 0.5 watt) and through an additional diode 84 (Motorola Co., part no. 1N4004). Thereafter, current from the lead 72 enters an opto-coupler unit 90 (Motorola Co., part no. H11A1). The opto-coupler unit 90 also receives current from the lead 74 of the capacitive discharge unit 30 as illustrated in FIG. 1. Functionally, the opto-coupler unit 90 consists of a light emitting diode positioned adjacent a transistor. The opto-coupler unit 90 provides ground current isolation between the ignition system 12 and the ECU 16. This greatly reduces the amount of electrical noise in the ECU 16 caused by firing of the spark plugs 48. The opto-coupler unit 90 allows the transfer of an electrical signal through photons instead of through direct connection of an electrical conductor such as copper or gold. Since there is no direct electrical connection, noise occurring due to the rapid voltage changes associated with spark plug activity will not transfer into the ECU 16. This prevents electrical interference with the operation of the ECU 16 and the scrambling of logic codes being executed by the microprocessor therein. Additional functions of the opto-coupler unit 90 will be described below.

The opto-coupler unit 90 is electrically connected through a line 92 having a resistor 94 therein (4.7K ohm, 0.5 watt) to a microprocessor 96 (Motorola Co., part no. MC68HC11). The resistor 94 performs a function known as "pullup". When the output transistor within the opto-coupler unit 90 turns off, it stops drawing current through the resistor 94. Thus, when the opto-coupler unit 90 is "on", line 92 will contain about 0 volts. When the opto-coupler unit 90 is "off", line 92 will contain about 5 volts.

The microprocessor 96 includes a clock 98, a signal detector 100, a battery disconnection signal generator 102, a fuel injector signal generator 104, and a fuel pump signal generator 106. The signal generator 104 controls at least one fuel injector 108 (Injection Research Specialists Inc., part no. 525-0020) in the fuel injection system 14. Likewise, the signal generator 106 controls a fuel pump 120 (Injection Research Specialists, Inc., part no. 525-0002) which delivers fuel to the fuel injector 108. The signal detector 100 is designed to receive the output of the ignition system 12 passing into the microprocessor 96 through the line 92, as described in greater detail in the "Operation" section below.

The signal generator 102 of the microprocessor 96 is connected to the base of a transistor 122 (Motorola Co., part no 2N3904) through a line 124 having a resistor 126 therein (4.7K ohm, 0.5 watt). In addition, the microprocessor 96 is connected through a line 130 to a solid state (series pass type) voltage regulator 132 (+5 volt DC, Motorola Co., part no. MC 7805). In turn, the voltage regulator 132 is connected through a line 136 to the collector of a transistor 140 (Motorola Co., part no. MJF107). The emitter of the transistor 140 is connected to the "run" position 54 of the key switch 52 as illustrated. The collector of the transistor 122 is electrically coupled to the base of the transistor 140 through a resistor 141 (3.3K ohm, 0.5 watt). Likewise, the collector of the transistor 122 is connected to the collector of the transistor 62 as shown. The function of transistors 62, 122, 140 will be described hereinafter.

In a preferred embodiment, the microprocessor 96, transistors 62, 122, 140, voltage regulator 132, resistors 60, 82, 94, 126, 141, zener diode 80, diode 84, and opto-coupler unit 90 may be manufactured as a pre-assembled module which comprises the ECU 16 (e.g. Injection Research Specialists Co., part no. 780-1000). However, the present invention shall not be limited to any specific type or arrangement of components, or to any particular manufacturers.

Finally, the key switch 52 is connected to a 12 volt DC storage battery 20 known in the art (Power Sonic Co., part no. PS1216.).

B. Operation

To start the snowmobile, the key switch 52 is turned momentarily to the start position 56. This turns on transistors 62, 140, and allows electrical power to flow into the microprocessor 96. In the microprocessor 96, the signal generator 102 turns on transistor 122. Thereafter, the engine operates normally, with the key switch remaining in the run position 54.

During engine operation, the electrical output from the ignition system 12 (generally in the form of pulses each being about 300 V in magnitude) is directed into the ECU 16 so that the output may be detected and analyzed. If the output voltage is less than a specified threshold value (e.g. about 50 V), the ECU 16 will disconnect itself from the battery 20. This is specifically accomplished as described below.

First, the electrical output passing through lead 72, zener diode 80, resistor 82, and diode 84 is directed into the opto-coupler unit 90. The opto-coupler unit 90 also receives the electrical output passing through lead 74. In addition to the functions described above, the opto-coupler unit 90 converts the electrical output from the ignition system 12 to a series of logic level signal pulses, each pulse having an initial voltage of about 4.0 V or greater and decreasing or "transitioning" to level of about 1.0 V or less (e.g. between 5.0 and 0 V in a preferred embodiment). In accordance with the invention, each pulse is defined as a "negative going voltage transition."

The signal detector 100 of the microprocessor 96 monitors the negative going voltage transitions, and determines if there are any gaps of a selected time period therebetween. The gaps described herein result when the kill switch 50 is activated which causes the output voltage from the ignition system 12 to drop below the specified threshold level (e.g. 50 V). Thus, when the output voltage drops below the threshold level, gaps between the negative voltage transitions will appear which are monitored by the signal detector 100. In a preferred embodiment, if more than 180 milliseconds passes between transitions due to stoppage of the engine (0 RPM) caused by activation of the kill switch 50, the clock 98 in the microprocessor 96 initializes and begins counting down for a selected time period (e.g. about 2.0 minutes). If normal voltage transitions resume prior to expiration of the selected time period, the ECU 16 will remain in operation. Otherwise, upon termination of the selected time period, the battery disconnection signal generator 102 sends a command signal to the transistors 62, 122, 140 causing them to switch off. As a result, power from the battery 20 is not allowed to flow through the voltage regulator 132 and into the microprocessor 96. This deactivates the entire ECU 16 (including the microprocessor 96) and prevents undesired battery drainage in an entirely automatic manner even if the key switch 52 remains on (e.g. in the run position 54).

The present invention represents an advance in the art of snowmobile electrical systems. It prevents battery drainage during activation of the vehicle kill switch, as indicated above. As a result, the snowmobile operator can use the kill switch for emergency or non-emergency purposes without being stranded due to battery discharge.

Having herein described a preferred embodiment of the invention, it is anticipated that suitable modifications may be made thereto by individuals skilled in the art within the scope of the invention. For example, the present invention monitors ignition system output (or lack thereof) to determine when ECU/battery disconnection should take place. This may ultimately be implemented in many ways. The invention shall therefore be construed only in accordance with the following claims

We claim:

1. In a snowmobile engine having a battery and at least one spark plug, an electronically controlled fuel system comprising:

fuel injection means for the delivery of fuel to said engine during the operation thereof;

ignition means for providing an electrical output to said spark plug sufficient to enable said plug to ignite s id fuel delivered by said fuel injection means;

electronic control means electrically connected to said battery for controlling the operation of said fuel injection means, said electronic control means comprising a microprocessor having detector means therein electrically coupled to said ignition means for determining when said electrical output of said ignition means drops below a minimum threshold level, said microprocessor further comprising signal generator means for generating a battery disconnection signal when said detector means determines that said electrical output of said ignition means is below said threshold level; and switch means electrically coupled between said battery and said microprocessor for receiving said battery disconnection signal from said signal generator means and disconnecting said electronic control means from said battery when said battery disconnection signal is received.

2. The apparatus of claim 1 wherein said microprocessor further comprises clock means operatively connected to said signal generator means for delaying the generating of said battery disconnection signal for a selected time interval after said detector means determines that said electrical output of said ignition means is below said threshold level.

3. The apparatus of claim 1 further comprising emergency engine deactivation means in electrical communication with said ignition means for reducing said electrical output of said ignition means below said threshold level.

4. The apparatus of claim 3 wherein said emergency engine deactivation means comprises a manually operable switch electrically coupled to said ignition means.

5. The apparatus of claim 1 wherein said ignition means comprises:

an alternator for producing an electrical current;

an electrical discharge unit having at least one capacitor therein for receiving said current from said alternator and storing said current; and an ignition coil for receiving said current stored within said capacitor of said electrical discharge unit, said ignition coil generating an electrical impulse for delivery to said spark plug of sufficient magnitude to enable said engine to operate

6. The apparatus of claim 5 further comprising a manually operable emergency engine deactivation switch in electrical communication with said electrical discharge unit, the activation of said switch preventing said ignition coil from generating said electrical impulse.

7. The apparatus of claim 5 wherein said alternator comprises a charge coil therein, said detector means of said microprocessor being electrically connected to said charge coil.

8. The apparatus of claim 1 wherein said fuel injection means comprises a fuel pump, and at least one fuel injector having fuel delivered thereto by said fuel pump.

9. The apparatus of claim 1 wherein said electronic control means further comprises conversion means for converting said electrical output of said ignition means to a series of logic level signal pulses, said logic level signal pulses being detected by said detector means.

10. The apparatus of claim 9 wherein said conversion means comprises an opto-coupler unit electrically coupled to said microprocessor.

11. In a snowmobile engine having a battery and at least one spark plug, an electrically controlled fuel system comprising:

fuel injection means for the delivery of fuel to said engine during the operation thereof comprising a fuel pump and at least one fuel injector having fuel delivered thereto by said fuel pump;

ignition means for providing an electrical output to said spark plug sufficient to enable said plug to ignite said fuel delivered by said fuel injection means, said ignition means comprising an alternator for producing an electrical current, an electrical discharge unit having at least one capacitor therein for receiving said electrical current from said alternator and storing said current, and an ignition coil for receiving said current stored within said capacitor of said electrical discharge unit, said ignition coil generating an electrical impulse for delivery to said spark plug of sufficient magnitude to enable said engine to operate;

electronic control means connected to said battery for controlling the operation of said fuel injection means, said electronic control means comprising a microprocessor having detector means therein electrically coupled to said ignition means for determining when the electrical output of said ignition means is below a minimum threshold level, said microprocessor further comprising signal generator means for generating a battery disconnection signal when said detector means determines that said electrical output of said ignition means is below said threshold level, and clock means for delaying the generation of said battery disconnection signal by said signal generator means for a selected time interval after said detector means determines that said electrical output of said ignition means is below said threshold level;

switch means electrically coupled between said battery and said microprocessor for receiving said battery disconnection signal from said signal generator means and disconnecting said electronic control means from said battery when said battery disconnection signal is received; and a manually operable emergency engine deactivation switch in electrical communication with said electrical discharge unit, the activation of said switch causing said electrical output of said ignition means to be below said threshold level.

12. The apparatus of claim 11 wherein said alternator comprises a charge coil therein, said detector means of said microprocessor being electrically connected to said charge coil.

13. The apparatus of claim 11 wherein said electronic control means further comprises conversion means for converting said electrical output of said ignition means to a series of logic level signal pulses, said logic level signal pulses being detected by said detector means.

14. In a snowmobile engine having a battery and at least one spark plug, an electrically controlled fuel system comprising:

fuel injection means for the delivery of fuel to said engine during the operation thereof comprising a fuel pump and at least one fuel injector having fuel delivered thereto by said fuel pump;

ignition means for providing an electrical output to said spark plug sufficient to enable said plug to ignite said fuel delivered by said fuel injection means, said ignition means comprising an alternator for producing an electrical current, an electrical discharge unit having at least one capacitor therein for receiving said electrical current from said alternator and storing said current, and an ignition coil for receiving said current stored within said capacitor of said electrical discharge unit, said ignition coil generating an electrical impulse for delivery to said spark plug of sufficient magnitude to enable said engine to operate;

conversion means for converting said electrical output of said ignition means to a series of logic level signal pulses, each of said pulses being separated by a specified time period;

electronic control means connected to said battery for controlling the operation of said fuel injection means, said electronic control means comprising a microprocessor having detector means therein electrically coupled to said ignition means for determining if each logic level signal pulses is separated by less than said specified time period, said microprocessor further comprising signal generator means for generating a battery disconnection signal when said detector means determines that each of said logic level signal pulses is separated by less than said specified time period, and clock means for delaying the generation of said battery disconnection signal by said signal generator means for a selected time interval after said detector means determines that each of said logic level signal pulses is separated by less than said specified time period; and switch means electrically coupled between said battery and said microprocessor for receiving said battery disconnection signal from said signal generator means and disconnecting said electronic control means from said battery when said battery disconnection signal is received.

15. A method for conserving battery power in a snowmobile having an engine, a battery, at least one spark plug, fuel injection means for delivering fuel to said engine, ignition means for providing an electrical output to said spark plug sufficient to enable said plug to ignite said fuel delivered by said fuel injection means, and electronic control means electrically connected to said battery for controlling the operation of said fuel injection means comprising the steps of:

sensing said electrical output of said ignition means;

determining if said electrical output is below a minimum threshold level; and automatically disconnecting said electronic control means from said battery if said output is below said threshold level.

16. The method of claim 15 further comprising the step of delaying said disconnecting of said electronic control means from said battery for a selected time interval after said determining if said electrical output is below said threshold level.

17. The method of claim 15 wherein said disconnecting of said electronic control means from said battery comprises the steps of:

providing switching means for controlling the flow of electrical current from said battery to said electronic control means, said switching means allowing said electrical current to flow from said battery to said electronic control means during the operation of said engine; and causing said switching means to prevent said electrical current from flowing to said electronic control means for said battery when said electrical output is below said threshold level.

18. The method of claim 15 further comprising the step of converting said electrical output of said ignition means to a series of logic level signal pulses.

19. The method of claim 18 wherein said determining if said electrical output of said ignition means is below a minimum threshold level comprises checking the amount of time between each of said pulses, said disconnecting of said electronic control means from said battery occuring when the amount of time between each of said pulses exceeds a specified value.

20. A method for conserving battery power in a snowmobile having an engine, a battery, at least one spark plug, fuel injection means for delivering fuel to said engine, ignition means for providing an electrical output to said spark plug sufficient to enable s id plug to ignite said fuel delivered by said fuel injection means, and electronic control means electrically connected to said battery for controlling the operation of said fuel injection means comprising the steps of:

providing switching means for controlling the flow of electrical current from said battery to said electronic control means, said switching means allowing said electrical current to flow from said battery to said electronic control means during the operation of said engine;

sensing said electrical output of said ignition means;

determining if said electrical output is below a minimum threshold level; and causing said switching means to prevent said electrical current from flowing to said electronic control means from said battery after the expiration of a selected time delay interval beginning when said electrical output is determined to be below said threshold value

21. The method of claim 20 further comprising the step of converting said electrical output of said ignition means to a series of logic level signal pulses.

22. The method of claim 21 wherein said determining of said electrical output of said ignition means is below a minimum threshold level comprises checking the amount time between each of said pulses, said disconnecting of said electronic control means from said battery occuring when the amount of time between each of said pulses exceeds a selected value.

23. A method for conserving battery power in a snowmobile having an engine, a battery, at least one spark plug, fuel injection means for delivering fuel to said engine, ignition means for providing an electrical output to said spark plug sufficient to enable said plug to ignite said fuel delivered by said fuel injection means, and electronic control means electrically connected to said battery for controlling the operation of said fuel injection means comprising the steps of:

providing switching means for controlling the flow of electrical current from said battery to said electronic control means, said switching means allowing said electrical current to flow from said battery to said electronic control means during the operation of said engine;

providing signal generating means within said electronic control means for producing a battery disconnection signal;

converting said electrical output of said ignition means to a series of logic level signal pulses;

checking the amount of time between each of said pulses; and activating said signal generating means if the amount of time between each of said pulses exceeds a selected value in order to produce said battery disconnection signal and deliver said battery disconnection signal to said switching means, said battery disconnection signal causing said switching means to prevent the flow of said electrical current to said electronic control means from said battery.

* * * * *